(12) United States Patent
Johnson

(10) Patent No.: US 6,830,121 B1
(45) Date of Patent: Dec. 14, 2004

(54) FUEL ECONOMIZER SYSTEM

(76) Inventor: Robert E. Johnson, 1453 Gloria Ct., Loveland, CO (US) 80537

( * ) Notice: Subject to any disclaimer, the term of this patent is extended or adjusted under 35 U.S.C. 154(b) by 135 days.

(21) Appl. No.: 09/974,391

(22) Filed: Oct. 10, 2001

(51) Int. Cl.$^7$ ............................................. F02B 37/12
(52) U.S. Cl. ...................................... 180/170; 60/602
(58) Field of Search ........................... 180/170; 60/602

(56) References Cited

U.S. PATENT DOCUMENTS

| | | | |
|---|---|---|---|
| 4,418,536 A | | 12/1983 | Deutschmann |
| 4,461,149 A | * | 7/1984 | Suzuki ........................ 60/602 |
| 4,463,565 A | * | 8/1984 | Rydquist et al. .............. 60/602 |
| 4,467,607 A | | 8/1984 | Rydquist et al. |
| 4,499,885 A | | 2/1985 | Weissenbach et al. |
| 4,505,117 A | | 3/1985 | Matsuoka |
| 4,528,816 A | | 7/1985 | Arnaud |
| 4,651,561 A | * | 3/1987 | Ueno et al. .................... 73/115 |
| 4,658,586 A | * | 4/1987 | Iwasa .......................... 60/602 |
| 4,679,398 A | | 7/1987 | Nishiguchi et al. |
| 4,848,086 A | * | 7/1989 | Inoue et al. ................... 60/602 |
| 4,926,640 A | * | 5/1990 | Kazuo et al. .................. 60/602 |
| 5,031,406 A | * | 7/1991 | Akiyama ...................... 60/602 |
| 5,174,119 A | * | 12/1992 | Hanauer et al. ............... 60/602 |
| 5,228,292 A | * | 7/1993 | Hanauer et al. ............... 60/602 |
| 5,228,368 A | * | 7/1993 | Kato et al. ..................... 477/33 |
| 5,442,918 A | * | 8/1995 | Baeuerle et al. .............. 60/602 |
| 5,477,840 A | * | 12/1995 | Neumann ................... 123/564 |
| 5,850,737 A | * | 12/1998 | Aschner et al. ............... 60/602 |
| 5,873,248 A | * | 2/1999 | Houtz .......................... 60/602 |
| 6,000,221 A | * | 12/1999 | Church et al. ................. 60/602 |
| 6,018,948 A | * | 2/2000 | Schnaibel et al. ............. 60/602 |
| 6,089,018 A | * | 7/2000 | Bischoff et al. ............... 60/602 |
| 6,155,049 A | * | 12/2000 | Bischoff ....................... 60/602 |
| 6,161,384 A | * | 12/2000 | Reinbold et al. .............. 60/602 |
| 6,220,232 B1 | * | 4/2001 | Torno et al. ................. 123/564 |
| 6,250,260 B1 | | 6/2001 | Green |
| 6,272,859 B1 | * | 8/2001 | Barnes et al. ................. 60/602 |
| 6,349,253 B1 | * | 2/2002 | Bellinger ..................... 701/53 |
| 6,510,691 B1 | * | 1/2003 | Schmid ........................ 60/602 |

* cited by examiner

Primary Examiner—Christopher P. Ellis
Assistant Examiner—J. Allen Shriver
(74) Attorney, Agent, or Firm—Rick Martin; Patent Law Offices of Rick Martin, P.C.

(57) ABSTRACT

A control system for increasing the fuel economy in a combustion engine by controlling the limit of turbo boost under a given set of conditions regarding vehicle speed. When a vehicle speed is above the manufactures drop-out speed, an intermediate set speed limit (between drop-out speed and cruise set speed) and a turbo boost limit is set. Turbo boost is limited to a specific pounds per square inch as long as the vehicle speed exceeds the intermediate set speed. By limiting the turbo boost, the fuel efficiency is increased while the vehicle is operating above the intermediate set speed. The vehicle FES can be designed to operate in an automatic mode, a semi-automatic mode or a manual mode, although an automatic mode of operation is most desirable.

18 Claims, 7 Drawing Sheets

FUEL ECONOMIZER SYSTEM

FIELD OF THE INVENTION

The present invention relates to a system for improved fuel efficiency in combustion engines utilizing a turbocharger by limiting the boost by the turbocharger control system under specified speed conditions.

BACKGROUND OF THE INVENTION

The present art concerning turbocharger systems in combustion engines monitor engine power requirements by various measurements such as exhaust temperature, charging pressure, etc. When specific requirements call for more horsepower a booster is activated which will increase the air and fuel. This increase creates more horsepower until a set speed is obtained. When a set speed (for example, cruise control) is obtained, the booster will decrease or deactivate.

U.S. Pat. No. 4,418,536 1981 to Deutschmann describes exhaust gas turbochargers, with one or more of the exhaust gas turbochargers being adapted to be disconnected during partial load.

U.S. Pat. No. 4,461,149 1981 to Suzuki describes a supercharger control system for an internal combustion engine by applying a supercharge pressure to the engine by driving a compressor with a turbine rotated by the energy of the exhaust gas.

U.S. Pat. No. 4,463,565 1982 to Rydquist et al. describes a system for preventing knocking combustion in a turbocharged Otto engine via a knock detector and microprocessor.

U.S. Pat. No. 4,467,607 1982 to Rydquist et al. describes a system for controlling the inlet pressure in a combustion engine including a microprocessor.

U.S. Pat. No. 4,499,885 1983 to Weissenbach describes a supplemental fuel system for a combustion engine having a primary fuel supply and a supplemental fuel supply.

U.S. Pat. No. 4,505,117 1982 to Matsuoka describes an internal combustion engine including a turbocharger and a controller for the turbocharger.

U.S. Pat. No. 4,528,816 1982 to Arnaud describes an apparatus for pneumatic control of supercharging pressure in a turbocompressed engine.

U.S. Pat. No. 4,679,398 1985 to Nishiguchi et al. describes an apparatus for controlling a variable geometry turbocharger including a compressor and a turbine coupled to the compressor and comprises a variable capacity device for varying the flow rate of an exhaust gas introduced into the turbocharger in the low speed state of an engine and an exhaust gas bypass device bypassing the variable capacity device and the turbine to control the flow rate of the exhaust in the high speed state of the engine.

U.S. Pat. No. 5,228,292 to Hanauer et al. describes an arrangement for adjusting the boost pressure in an internal-combustion engine, supercharged by an exhaust-gas turbocharger with adjustable turbine diffuser, to a predetermined desired boost-pressure value dependent on the operating point.

U.S. Pat. No. 5,174,119 1991 to Hanauer et al. describes a process for adjusting the boost pressure in an internal-combustion engine, supercharged by an exhaust-gas turbocharger with adjustable turbine diffuser, to a predetermined desired boost-pressure value dependent on the operating point.

U.S. Pat. No. 5,850,737 1996 to Aschner et al. describes a process for adjustment of the charging pressure in an internal-combustion engine exhaust gas turbocharger having an adjustable turbine geometry, to a pre-determined operating-point-dependent desired charging pressure level.

U.S. Pat. No. 6,155,049 1999 to Bischoff describes a method of controlling the charge air mass flow of an internal combustion engine having an exhaust gas turbocharger with adjustable turbine geometry and a control unit for controlling the operation of the turbocharger.

U.S. Pat. No. 6,250,260 B1 1998 to Green describes a system and assembly for modifying a diesel powered electric generator.

What is needed is a process for allowing the vehicle to have a decrease in fuel consumption for a small sacrifice in vehicle speed. What is also needed is a process to allow the vehicle private owner (or company owner) to set maximum limits of boost speed under specific conditions.

SUMMARY OF THE INVENTION

The main aspect of the present invention is to provide a means for fuel optimization within specific limits of speed and boost pressure to a combustion engine.

Another aspect of the present invention is to limit a vehicle boost pressure within specified limits when the speed of a vehicle is at or drops below cruise set speed.

Another aspect of the present invention is to allow for a vehicle owner (private or company) to have the ability to vary the boost pressure set limit when the speed of a vehicle is at or drops below cruise set speed.

Another aspect of the present invention is to provide for an automatic means of fuel economization, the preferred embodiment.

Another aspect of the present invention is to provide for a semi-automatic means of fuel economization, an alternate embodiment.

Another aspect of the present invention is to provide for a manual means of fuel economization, an alternate embodiment.

Other aspects of this invention will appear from the following description and appended claims, reference being made to the accompanying drawings forming a part of this specification wherein like reference characters designate corresponding parts in the several views.

Combustion engines with turbochargers will operate at optimal engine performance with an Electronic Control Module (ECM) or other means for controlling the turbocharger. The ECM, operating in normal control mode, will monitor standard engine inputs such as exhaust gas temperature, etc. The control systems of prior art will provide the engine with a quick increase in horsepower (HP) when required. For example, when cresting a hill and the speed decreases below the set cruise speed, a vehicle's turbocharger will increase boost until the set cruse speed is re-obtained. Thus, if a hill crest, headwind, or a slight incline results in a vehicle going below cruise set speed, the turbo will go into maximum boost until the vehicle regains its set cruise speed. Although this method maintains a set cruise speed at minimal loss of time, it does not offer any alternative of fuel savings for some additional minimal loss of time.

All "Fuel Economizer System" (FES) equipped vehicles shall have a "drop-out" speed, which is determined by the engine manufacturer. The drop-out speed is that speed below a set cruise control speed at which the cruise control "disconnects". Drop-out speeds are to be non-adjustable and will vary with different transmission and differential combinations as set by the engine and vehicle manufacturer.

The present invention FES would consist of circuitry to active the system, to accept input of a boost pressure limit (BPL), to accept input of a minimal speed (economy set-speed or ESS), sensors to insure that the cruise control is "ON", vehicle real-time speed sensors, vehicle drop-out speed inputs, etc. The FES circuitry might also have a display showing status of the system (ON or OFF), ESS and BPL settings. The present invention Fuel Economizer System (FES) will function to limit the engine's turbocharger boost and fuel consumption when the vehicle is running at highway speeds. The FES can be used for Owner/Operator specified vehicles and also for fleet specified vehicles.

The FES will allow for normal Electronic Engine Control (EEC) when the vehicle speed is below the drop-out speed or when the vehicle speed is below a pre-determined "economy-set-speed" (ESS). The ESS will be a speed higher than the drop-out speed but below set cruise speed.

In the preferred embodiment of the present invention, the FES will operate under the following required conditions:
  a) The FES is set to the "on" position,
  b) The vehicle cruise control is "on",
  c) The vehicle speed is above the drop-out speed, and
  d) An ESS speed is preset and the vehicle speed is above the ESS.
  e) A preset (or variable) maximum boost limitation is present.

Given that the above conditions are satisfied, the present invention FES will act as follows:
  a) Provide an input to the ECM to limit the turbo boost to a specific preset value, such value set by the operator/owner (as a variable) or by the fleet owner (as a constant). The ECM will constantly monitor and limit the turbo boost to the value set by the FES. Under such conditions the ECM will regulate the fuel flow to each cylinder based on a fuel rate predetermined by the engine manufacture. Such fuel rate will be the fuel consumption that allows for the cleanest emissions and optimum horsepower at a given engine rpm and turbo pressure.
  b) Monitor the required conditions and input the ECM to operate in a normal or limited boost mode.

If the above-required conditions are not met the FES will provide an input to the ECM to control the engine in a normal mode under normal operating conditions concerning boost and fuel conditions.

If the required conditions are satisfied, the FES will allow for speed recovery at a controlled boost in order to optimize the fuel efficiency. For example, if there is an incline in the road. If the distance traveled during maximum boost is 300 yards (under normal operating conditions) in order to regain set cruise speed, for example, the vehicle may only get 2.5 miles per gallon (MPG) during that distance in which the engine is at maximum boost (35 pounds per square inch "psi", for example). The present invention will allow for a limitation of the turbo boost (10 psi for example). It may take 400 yards to regain the engine set cruise speed, but the fuel consumption can be improved to 6.8 to 7.0 MPG for that 400 yards.

Owner/operator vehicles can be set up to operate with three toggle switches on the vehicle's dash. The switches would function as follows:
  1. A FES toggle switch with an "ON" and "OFF" position.
    In the "OFF" position the vehicle will bypass all FES controls. The switch can have a pilot light to indicate the "ON" position.
  2. A second momentary contact type toggle switch to "Raise" or "Lower" boost limit pressure upon contact in an up or down position respectively.
  3. A third momentary contact toggle switch to "Raise" or "Lower" the Economy Set Speed upon contact in an up or down position respectively.

A simple display could show the status of the above settings.

Although the above is described with toggle switches, other control means can be designed, such as touch displays, variable control knobs, etc.

Fleet specified FES control could be accomplished by values (turbo boost limit, dropout and ESS) pre-set into the electronic memory of the ECM by the fleet's mechanics. In this way, the fleet ownership can control the FES settings as desired. A fleet owner can alternatively elect to also use controls as described above for owner/operator controls.

An example of the FES operation is presented as follows:
  1. The vehicle cruise control is set at 70 MPH.
  2. The FES is set to maintain a boost pressure of 10 psi max.
  3. The ESS is set to 62 MPH.

With the settings above, if the vehicles, speed is 63 MPH or more, the FES will limit turbo boost to 10 psi max. When the speed of the vehicle drops to 62 MPH or less, the ECM automatically bypasses the FES and returns to its "normal" turbo boost and fuel consumption control.

When operating with the FES in the "ON" position a vehicle will have a limit on the turbo boost allowed as long as its speed is above the ESS. During these conditions of limited boost, the MPG will increase and have a positive effect on the average MPG over a long distance. By use of the FES the vehicle will see an increase in average MPG and thus have a positive gain in fuel efficiency. The owner of the present invention has shown "at least" a one-mile per gallon gain when operating a vehicle over a year's timeframe.

The following is an example of savings that are potentially available at an increase of 1-MPG assuming accuracy of the following estimated figures:
  1. That there are approximately 6 million diesel powered over-the-road trucks.
  2. That the average fuel consumption is approximately 6 MPG.
  3. That average miles driven per vehicle are approximately 100,000 miles.
  4. That average fuel consumption is approximately 16,667 gallons per vehicle.
  5. A savings of 1 MPG would result in an average MPG of 7. Thus, the result would be to reduce fuel consumption from 16,667 gallons to 14,286 gallons, a savings of 2381 gallons per vehicle. The net savings for 6 million trucks would amount to 14,286,000,000 gallons of fuel. That is over 14 billion gallons of fuel. That equates to hundreds of millions of barrels of crude oil that is saved per year.

An alternate embodiment of the present invention is a to provide for a semi-automatic mode of operation. In this mode a boost pressure regulator would be installed in the turbocharger system to be activated with an ON/OFF switch. The boost regulator would act as a "limiter", that is, it would limit the boost to a predetermined level (10 psi for example). In the "OFF" position the normal turbocharger operation would prevail. In the "ON" position, the boost pressure regulator would bypass the normal turbocharger boost system. When the vehicle speed goes above the ESS (as determined by the operator), the operator would switch the boost regulator switch to an "ON" position. Boost regulation would remain in effect until the speed of the vehicle would drop below the ESS. At that time an alarm (audio or video) would activate and the operator would turn the boost regulator to the "OFF" position. In this manner, the vehicle would operate in a semi-automatic mode regulating (limiting) the boost pressure automatically with vehicle speed greater than the ESS. The semi-automatic mode of operation will function as described above independent of the cruise control setting.

Example:

Trucker "Bob" drives his rig (vehicle), weighing 80,000 pounds of gross vehicle weight (GVW), at 65 mph on a level stretch of interstate highway. His vehicle has a boost pressure regulator (boost pressure limiter) and a turbo boost gauge installed. It should be noted that a boost pressure gauge can be labeled with various identifiers such as "turbo boost gauge, turbo, pressure gauge, boost pressure gauge, etc." The boost pressure regulator is set to limit the boost pressure to 10 psi maximum, for example. Further, "Bob" decides not to drive slower than 60 mph nor faster than 75 mph, all in the highest gear and with the cruise control "off". "Bob" has thus determined his ESS to be 60 mph. He then monitors the speed gauge and, if the speed is above 60 mph (ESS), he sets the boost regulator switch to "ON". The turbo boost pressure would then be limited to 10 psi, that is, the boost pressure would vary between 0 and 10 psi max) during vehicle operation and thus increase fuel economy. If the vehicle drops below the ESS, an alarm would sound and "Bob" would set the boost regulator switch to "OFF". If no alarm were installed, "Bob" would have to manually monitor the speed. Once the vehicle speed is below the ESS and the boost regulator switch is "OFF", "Bob" would operate the vehicle in a normal mode. That is, he would either apply more pressure to the accelerator pedal (increasing the boost) or shift to a lower gear or both. It should be noted that the gear may or may not be the "highest" gear. A vehicle may operate in a high gear that is not necessarily the "highest gear" depending on such factors as the speed limit, the grade, etc. Note: If Bob had elected to keep the cruise control off, the upper speed limit would be determined by Bob's application of pressure on the accelerator pedal. Another alternate embodiment of the present invention would be a manual mode. A manual mode would not be nearly as efficient as the operator would have to monitor several variables. In this mode, it would be very desirable for the vehicle to have a fuel system monitor and real time MPG monitor installed for the operator's convenience. The vehicle would require a cruise control and a turbo boost gauge. With the cruise control "ON", the operator would monitor vehicle speed and the turbo boost gauge. Monitoring the vehicle speed, if the speed is above the operators predetermined ESS, the operator would monitor boost pressure and try to limit boost pressure to a predetermined level (10 psi for example). Boost pressure would be limited by physically applying less pressure to the accelerator pedal. The real time MPG monitor would show an increase in instantaneous MPG as the boost is decreased and held to a predetermined value.

Example Of Manual Control:

Trucker "Bob" drives his rig (vehicle), weighing 80,000 pounds of gross vehicle weight (GVW), at 65 mph on a level stretch of interstate highway and determines that his boost pressure limit (BPL) can be 10 psi maximum. Downgrades in the road can increase his speed. Further he decides not to drive slower than 60 mph nor faster than 75 mph, all in the highest gear and with the cruise control "off". "Bob" has thus determined his ESS to be 60 mph and his BPL to be 10 psi. He then monitors the speed gauge and, if the speed is above 60 mph (ESS) and below 75 mph, he limits the boost pressure to 10 psi, or lower, by controlling his foot pressure on the accelerator pedal.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
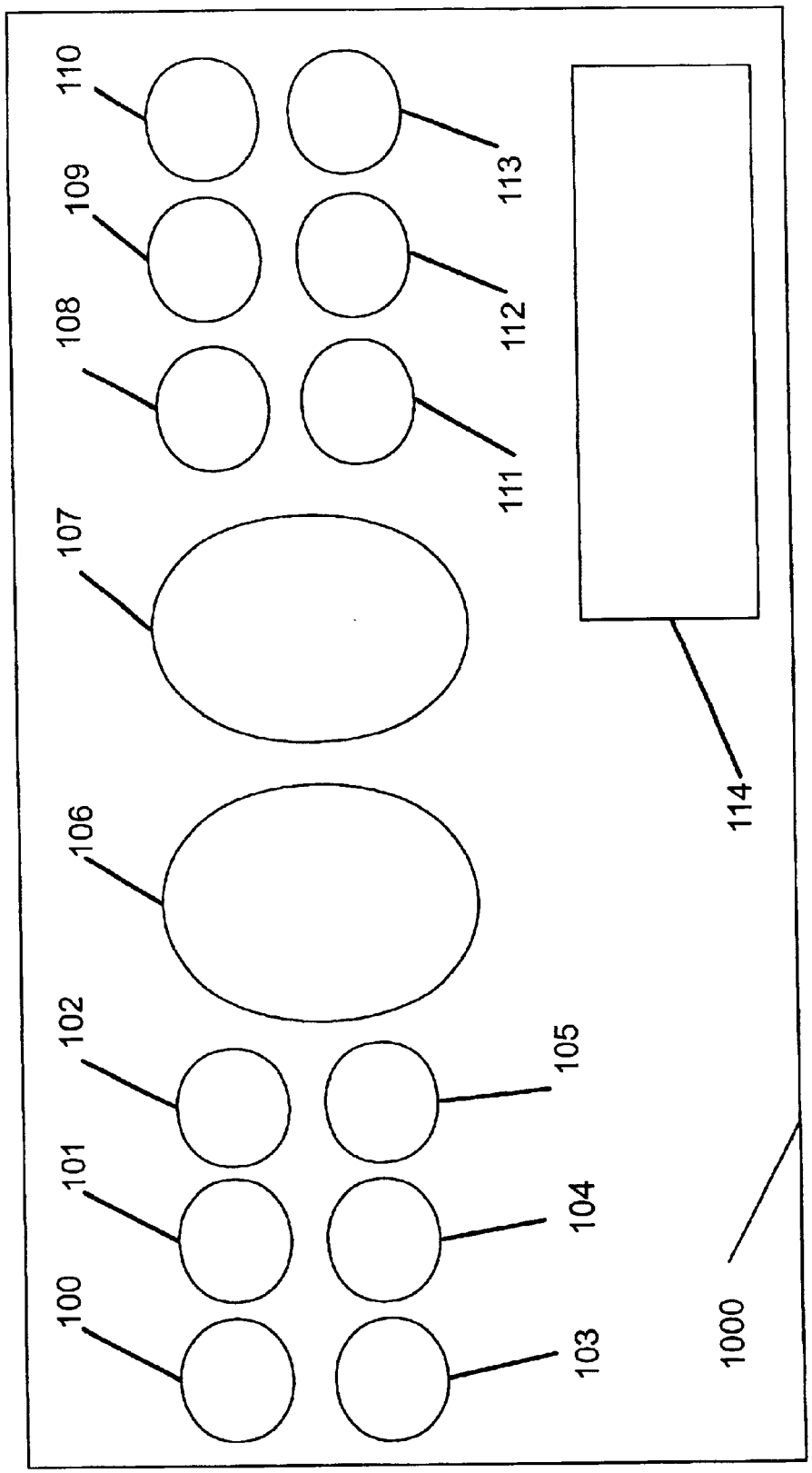
FIG. 1 shows a typical operator dash board.

FIG. 1 shows a typical operator dash board 1000. Although there are many types of operator dashboards, FIG. 1 is presented to show typical operator conditions that can be monitored. Descriptions of the values that can be typically monitored are as follows:

a) Water Temperature 100
b) Oil Pressure 101
c) Oil Temperature 102
d) Transmission Temperature 103
e) Turbo Boost Pressure 104
f) Fuel Level 105
g) Engine Revolutions Per Minute (RPM) 106
h) Vehicle Speed 107
i) Primary Air Pressure 108
j) Secondary Air Pressure 109
k) Applied Air Pressure 110
l) Voltage Ammeter 111
m) Cabin Air Temperature 112
n) Outside Air Temperature 113
o) Operator Display Monitor 114

Figure 1A:
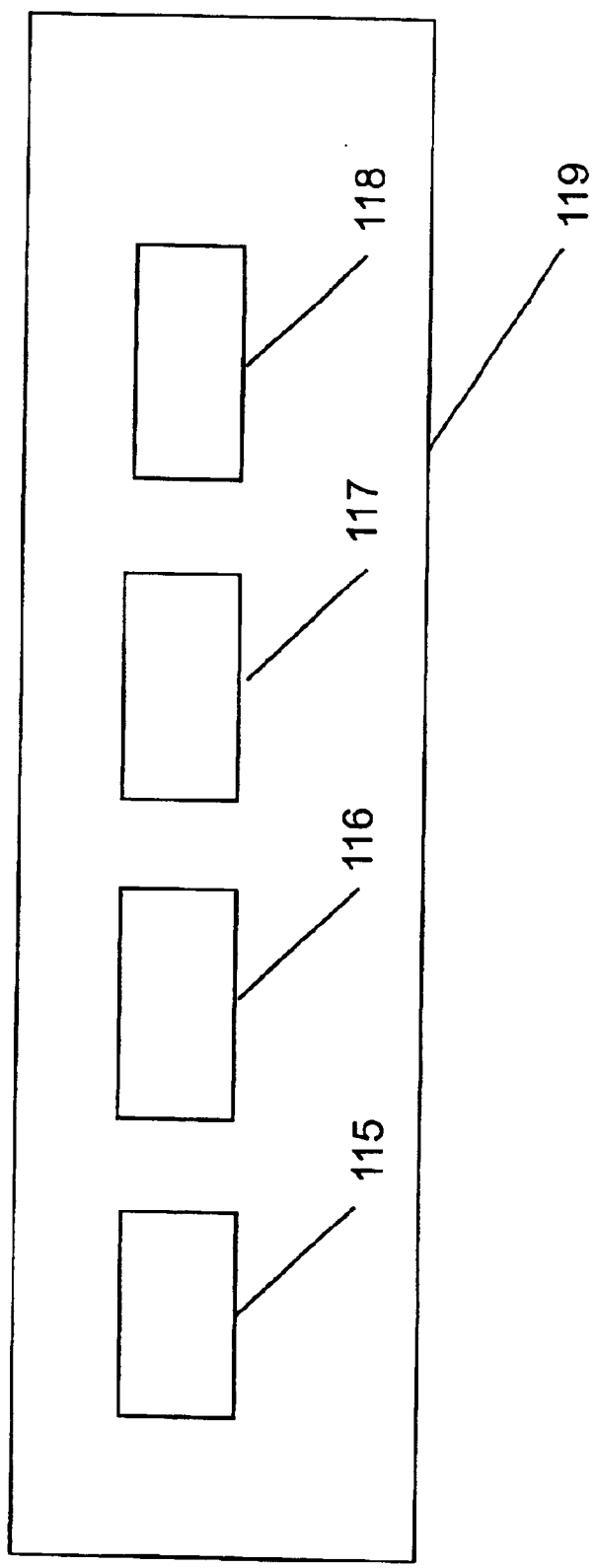
FIG. 1A shows a typical operator switch panel to control the output display on the operator dashboard.

Although several displays are sometimes required by law, such as the primary air pressure 108, secondary air pressure 109 and air applied 110 others can be optional or replaced by other monitors, such as cabin air temperature 112 or outside air temperature 113. An operator display monitor 114 output can be activated in various modes by the vehicle operator to display various operating conditions. Such conditions displayed could be as follows:

a.) Average Miles per Gallon (MPG)
b.) Average Miles per Hour
c.) Trip Odometer #1
d.) Trip Odometer #2
e.) Expected Range with remaining fuel
f.) Real-time MPG FIG. 1A shows a typical operator switch panel 119 to control the output display on the operator dashboard (see display monitor 114 of FIG. 1). For example, one momentary contact switch 115 can be pushed to display the average MPG, another momentary contact switch 116 can be pushed to display the trip odometer #1 while a third momentary contact switch 117 can be pushed to display the trip odometer #2. A reset button 118 will set the default display, which may show the real-time MPG. Various other combinations of the switches could also display average MPH, remaining range based on present fuel level, etc.

Figure 2:
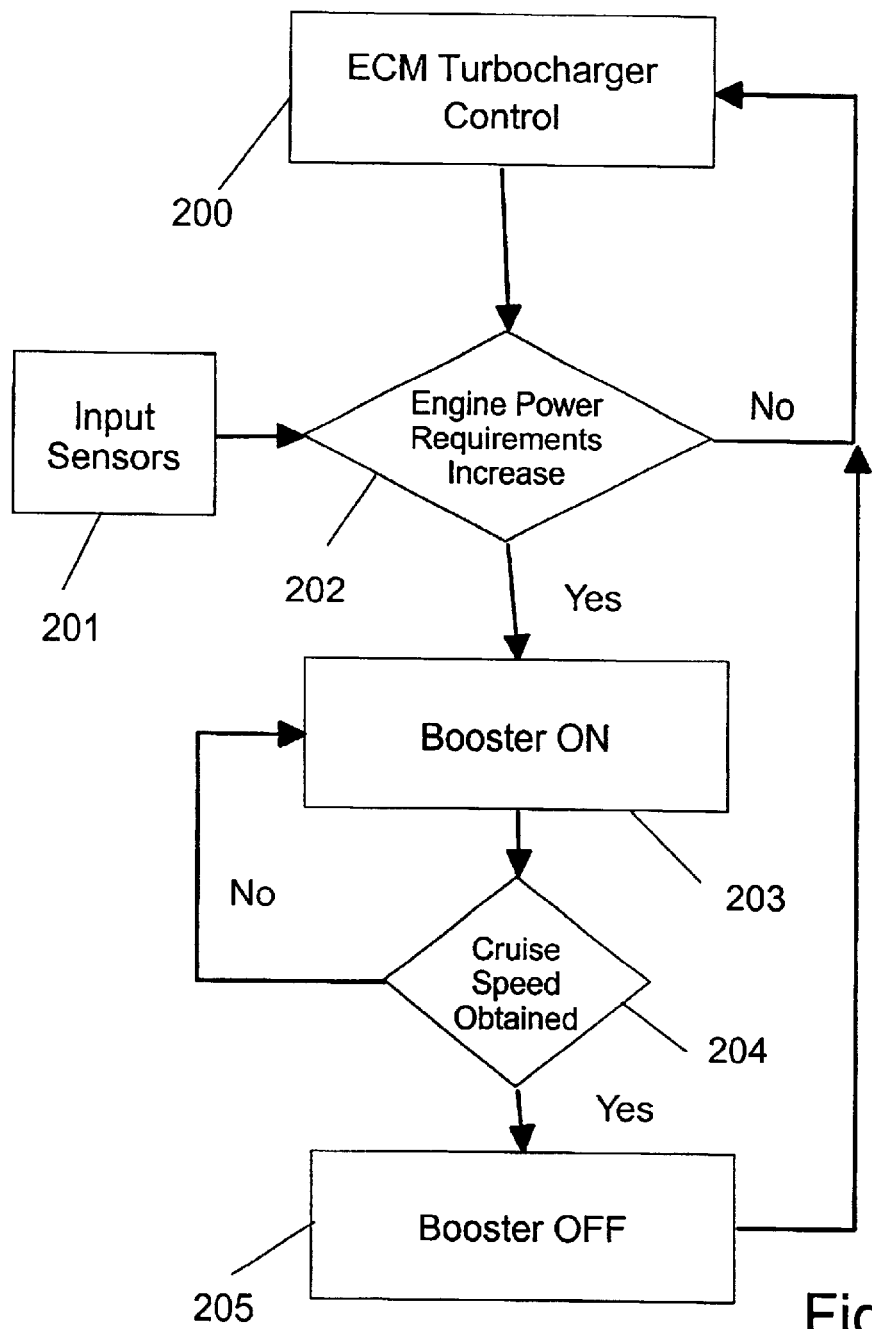
FIG. 2 is a flow diagram of the prior art showing a typical engine output display control panel.

FIG. 2 is a flow diagram of the prior art showing a typical engine output display control panel. An Electronic Control Module (ECM) in monitor mode 200 monitors and controls turbocharger boost and monitors engine power requirements 202 via input sensors 201. If power requirements increase the booster is turned on 203 until the vehicle has re-attained cruise speed 204. If cruise speed is obtained 204, the booster is turned off 205 and the ECM goes back to control monitor mode 200.

Figure 3:
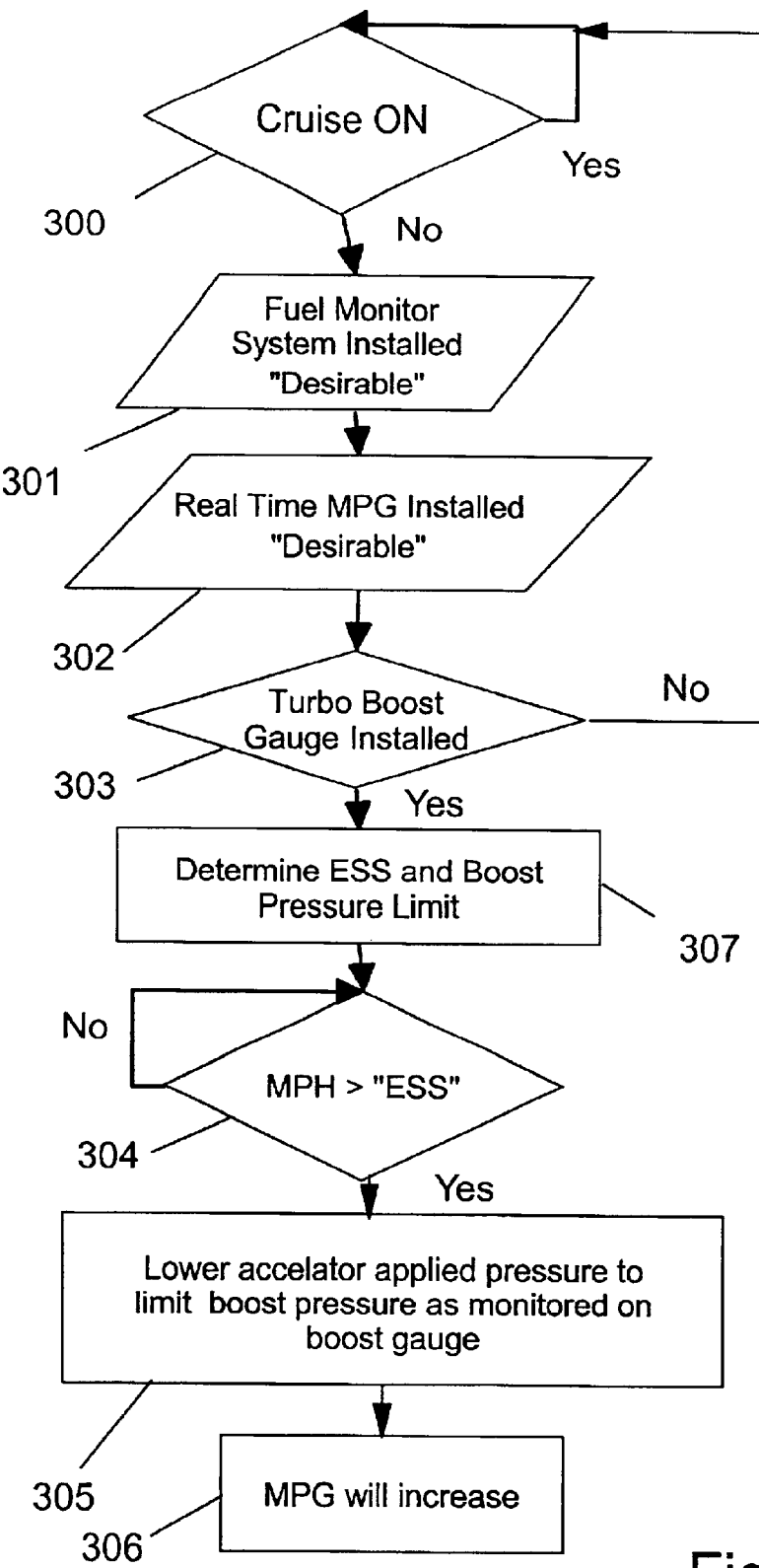
FIG. 3 is a flow chart of an alternate embodiment of the present invention showing a manual method of fuel economizing.

FIG. 3 is a flow chart of an alternate embodiment of the present invention showing a manual method of fuel economizing. In the manual mode of operation the cruise control is first set to "ON" 300. Although not absolutely necessary it is highly desirable for the vehicle to have a fuel monitor system 301 and a real-time MPG indicator installed 302. A turbo boost gauge 303 is required. The operator selects an ESS and a boost limit 307. The operator monitors the MPH 304. If the MPH is above the ESS, the operator also monitors the turbo boost gauge and lowers the accelerator pressure to limit boost pressure (10 psi, for example) to a predetermined level 305. There will be an instantaneous increase in MPG 306, which would be visible to the operator via a display (if present in the vehicle).

Figure 4:
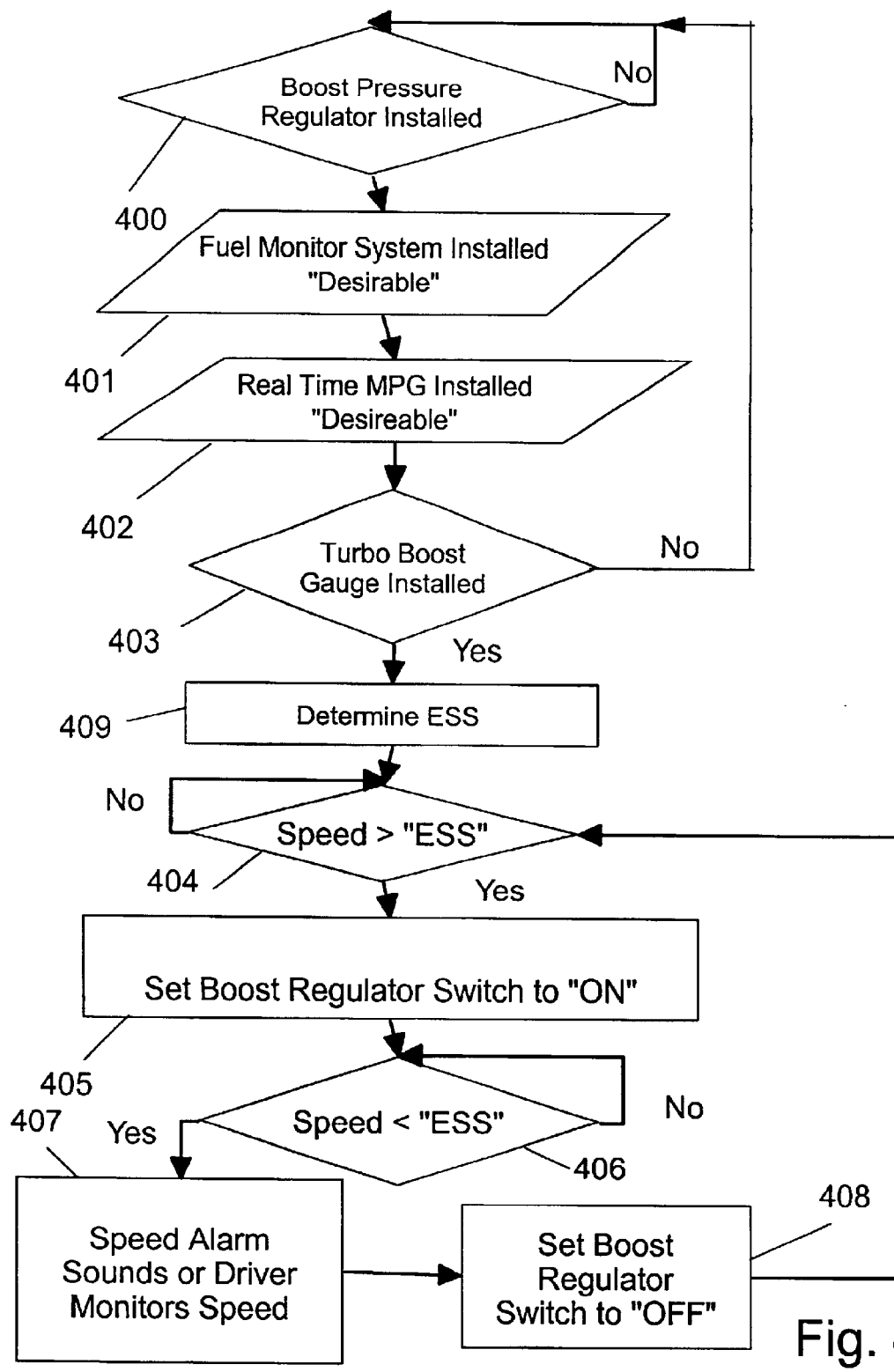
FIG. 4 is a flow chart of an alternate embodiment of the present invention showing a semi-automatic method of fuel economizing.

FIG. 4 is a flow chart of an alternate embodiment of the present invention showing a semi-automatic method of fuel economizing. It is a requirement to have a boost pressure regulator (limiter) installed 400 for operator monitoring. It is desirable to have a fuel monitor system 401 and a real-time MPG display 402 but not an absolute requirement. It is also a requirement to have a boost gauge installed 403. The boost regulator installed 400 would limit the turbo boost to a pre-specified value (10 psi, for example). The vehicle operator would select an Economy Set Speed (ESS) 409 and monitor to see if the vehicle speed is higher than the ESS 404. If the vehicle speed becomes greater than the ESS 404, the operator would set the boost regulator to the "ON" position 405. If the vehicle speed slows to less than the ESS 406, a speed alarm could sound 407 or the vehicle operator would simply monitor the vehicle speed 407. The vehicle operator would then set the boost regulator switch to the "OFF" position 408 and continue to monitor vehicle speed 404. In this alternate embodiment of the present invention, the vehicle operator has minimal tasks to perform (monitor vehicle speed and set boost regulator switch) as compared to a fully manual method described above.

Figure 5A:
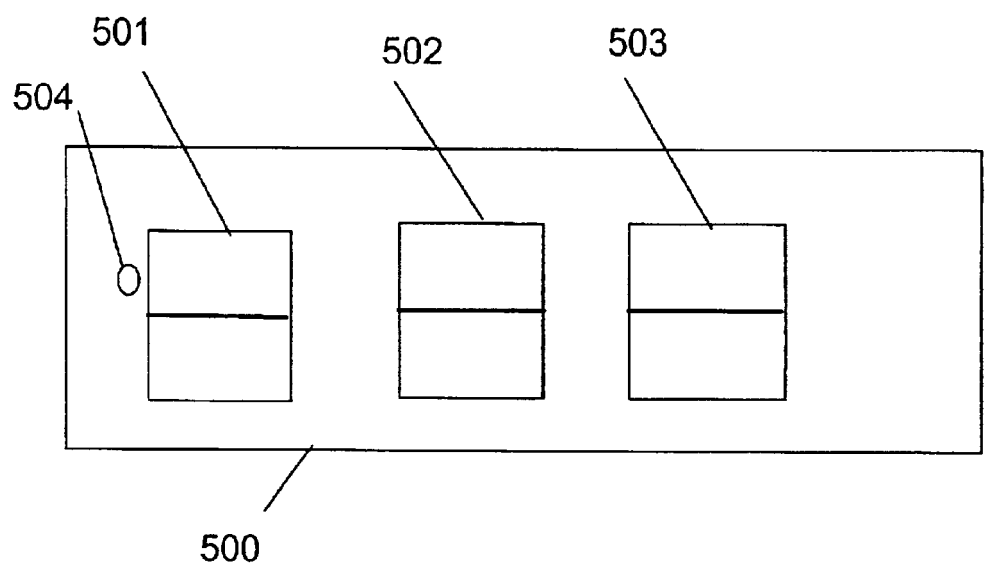
FIG. 5A shows a control input panel for operator input for the preferred embodiment of the present invention (versus fleet managed inputs).
Figure 5B:
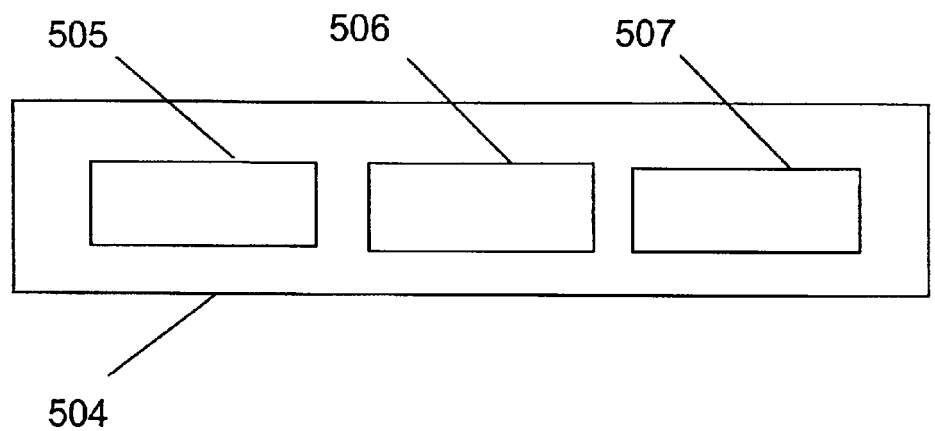
FIG. 5B shows a simple display monitor showing the FES, Boost Set and ESS status.
Figure 5C:
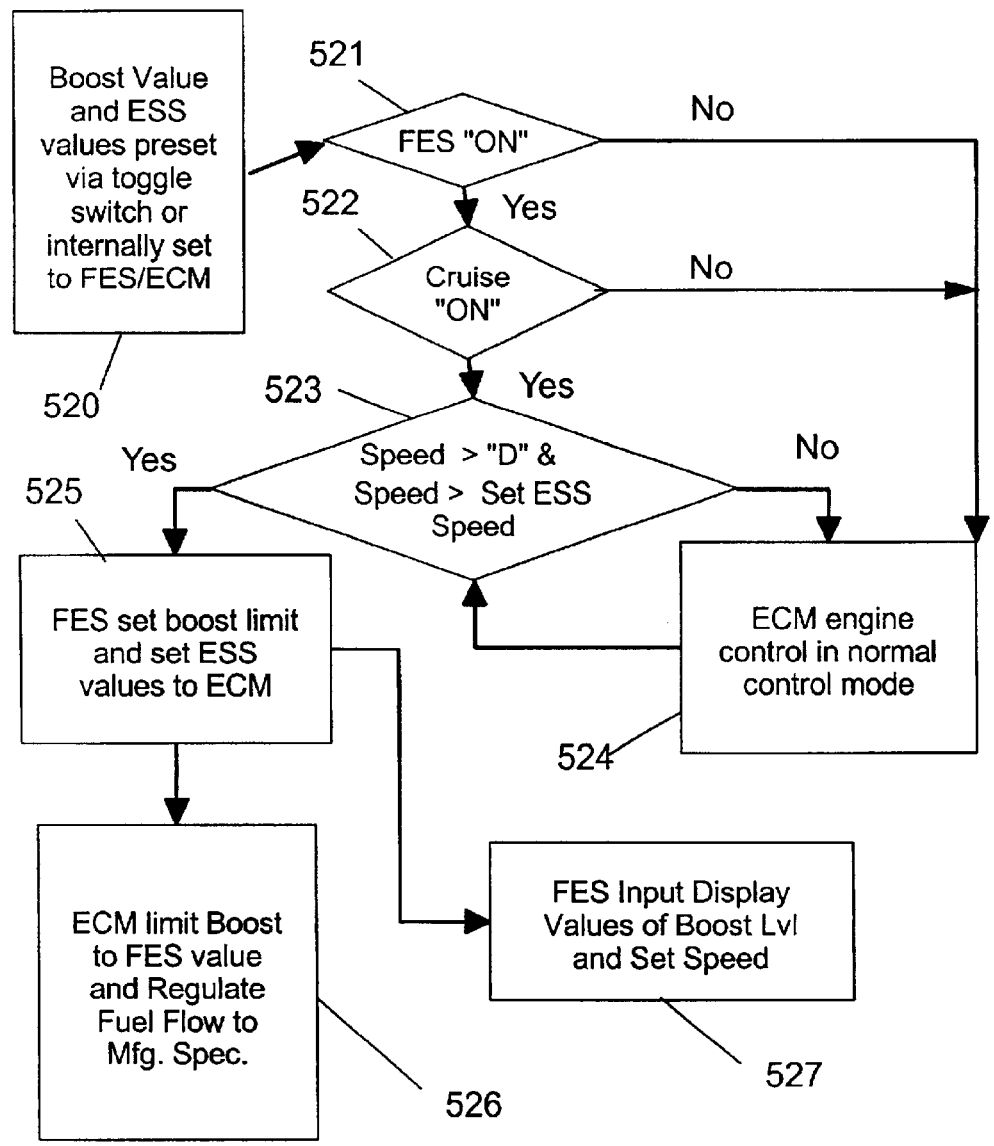
FIG. 5C is a flow chart of the preferred embodiment of the present invention, the FES automatic system for fuel economizing.

The preferred embodiment of the present invention is described by FIGS. 5A, 5B, 5C.

FIG. 5A shows a control input panel 500 for owner/operator input for the preferred embodiment of the present invention (versus fleet managed inputs). The control input panel 500 would contain three switches. A FES toggle switch 501 would set the FES to the "ON" (enable FES) or "OFF" (disable FES) position. A momentary contact ESS switch 502 would increase the set ESS when toggled up or decrease the set ESS when toggled down. A momentary contact boost switch 503 would increase the set boost psi when toggled up or decrease the set boost psi when toggled down. It should be noted that in fleet owned vehicles, the input control panel may not be required or may be simplified to have a limited amount of switches. Fleet mechanics could preset one or both the boost limitation and the ESS depending on the fleet owner's preferences and have the FES always "ON" if desired. Thus the input control panel 500 design for fleet owned vehicles could range from nonexistent to having one, two or three switches. A LED (Light Emitting Diode) 504 could be included in the design to indicate the FES status as "ON".

FIG. 5B shows a simple display monitor 505 showing the FES status 506, Boost Set status 507, and ESS set status 508. The FES status 506 would indicate the FES to be either "ON" or "OFF". The Boost Set status display 507 would display the present boost setting (10 psi for example). If the vehicle operator were to toggle "Up" or "Down" the boost switch (503 of FIG. 5A), the Boost Set status display 507 would change accordingly. The ESS set status display 508 would show the ESS set speed. If the vehicle operator were to toggle "Up" or "Down" the ESS switch (502 of FIG. 5A), the ESS set status display 508 would change accordingly.

As previously described above in FIG. 5A, a LED could be placed on the control input panel 500, in which case, the display monitor 505 would not "require" another FES status 506 to be displayed. Also, fleet owned vehicles may or may not have a control input panel 500 or a display monitor 505. Fleet owners would have the option of not installing these or modifying requirements to a sub-set of input switches or displays available to the vehicle operator(s).

Although the present invention has been described with reference to preferred embodiments, numerous modifications and variations can be made and still the result will come within the scope of the invention. No limitation with respect to the specific embodiments disclosed herein is intended or should be inferred.

FIG. 5C is a flow chart of the preferred embodiment of the present invention, the FES automatic system for fuel economizing. To implement the FES system in an automatic mode a predetermined boost value (psi) and ESS is inputted 520 via toggle switches or preset as previously discussed in FIGS. 5A, 5B. If the FES status 521 is not "ON" the ECM will run in normal ECM engine control mode 524. If the FES is "ON" the system will check to determine if Cruise is "ON" 522. If cruise is not "ON" the ECM will run in normal ECM engine control mode 524. If cruise is "ON" 522 the FES system will check to determine if the vehicle speed are both above drop-out speed "D" and above set ESS speed 523. If the vehicle speed is not above both the drop-out speed and set ESS 523 the ECM will run in normal ECM engine control mode 524. If the vehicle speed is above both the drop-out speed and the set ESS speed 523, the FES will input the ECM to set the boost limit and set ESS speed values 525. The ECM will then control the engine at the conditions for the preset speed and limited boost value according to the engine manufacturer's specifications 526.

In the manner described above, the vehicle will realize a savings in fuel with only a minor loss of travel time over the road.

I claim:

1. Using a motor vehicle having an internal combustion engine and a turbocharger for the engine, the motor vehicle having a speedometer and a turbo output gauge, a method to increase miles per gallon, comprising the steps of:

selecting a turbo boost pressure limit (BPL) using the turbo output gauge;

determining a minimal speed for the motor vehicle;

operating a throttle to control a vehicle speed at or above the minimal speed while keeping the turbo boost pressure at or below the BPL; and using a boost pressure limiter to limit the turbo boost pressure to at or below the BPL when the vehicle is above the minimal speed.

2. The method of claim 1 further comprising the steps of selecting a maximum speed and operating the throttle to control the vehicle at or below the maximum speed.

3. The method of claim 2 further comprising the step of operating the motor vehicle in a high gear.

4. The method of claim 3 further comprising the step of operating the vehicle in a normal mode when the vehicle speed falls below the minimal speed.

5. The method of claim 1 further comprising the step of turning off the boost pressure limiter when the vehicle speed falls below the minimal speed.

6. Using a motor vehicle having an internal combustion engine, a turbocharger for the engine, a boost pressure limiter for the turbocharger, and a speedometer, a method to increase miles per gallon, comprising the steps of:

selecting a turbo boost pressure limit (BPL);

setting the BPL on the boost pressure limiter;

determining a minimal speed for the motor vehicle;

operating a throttle to control a vehicle speed at or above the minimal speed; and using a cruise circuit to monitor the boost pressure, to recognize the BPL, to recognize the minimal speed, and to control the throttle to maintain a speed above the minimal speed while maintaining the boost pressure at or below the BPL.

7. The method of claim 6 further comprising the steps of selecting a maximum speed and operating the throttle to control the vehicle at or below the maximum speed.

8. The method of claim 7 further comprising the step of operating the motor vehicle in a high gear.

9. The method of claim 6 further comprising the step of operating the vehicle in a normal mode when the vehicle speed falls below the minimal speed.

10. The method of claim 6 further comprising the step of turning off the boost pressure limiter when the vehicle speed falls below the minimal speed.

11. The method of claim 6 further comprising the step of using the cruise circuit to control the throttle to maintain a speed at or below a maximum set point speed.

12. The method of claim 11 further comprising the step of sensing a drop of vehicle speed below the minimal speed.

13. The method of claim 12 further comprising the step of activating an alarm when the vehicle speed drops below the minimal speed.

14. The method of claim 12 further comprising the step of bypassing the cruise circuit when the vehicle speed drops below the minimal speed.

15. The method of claim 6 further comprising the step of limiting access to a set of cruise circuit variables including BPL.

16. A method to increase miles per gallon in a motor vehicle, comprising the steps of:

using a turbocharger on an engine;

using an electronic cruise circuit to store variables including a boost pressure limit (BPL), and a minimal speed; and using a speed sensor and the cruise circuit to control a vehicle speed above the minimal speed while maintaining the boost pressure at or below the BPL.

17. The method of claim 16 further comprising the step of using the cruise circuit to control a maximum speed.

18. The method of claim 17 further comprising the step of disengaging the cruise circuit when the vehicle speed drops below the minimal speed.

* * * * *